(12) United States Patent
Suzuki

(10) Patent No.: US 11,137,956 B2
(45) Date of Patent: Oct. 5, 2021

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Nayuta Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/924,167

(22) Filed: Jul. 8, 2020

(65) Prior Publication Data

US 2021/0247939 A1 Aug. 12, 2021

(30) Foreign Application Priority Data

Feb. 12, 2020 (JP) .............................. JP2020-021897

(51) Int. Cl.
*G06F 3/12* (2006.01)
(52) U.S. Cl.
CPC ............ *G06F 3/123* (2013.01); *G06F 3/1204* (2013.01); *G06F 3/1225* (2013.01)
(58) Field of Classification Search
CPC ....... G06F 3/123; G06F 3/1204; G06F 3/1225
See application file for complete search history.

(56) References Cited

U.S. PATENT DOCUMENTS

| 9,405,769 B2* | 8/2016 | Hagiwara | ............... G06F 16/29 |
| 2003/0063305 A1* | 4/2003 | McIntyre | ............. G06K 15/005 |
| | | | 358/1.13 |
| 2011/0299120 A1* | 12/2011 | Sekine | .................. G06F 3/1221 |
| | | | 358/1.15 |
| 2018/0101340 A1* | 4/2018 | Nakatani | ............ H04N 1/00413 |
| 2018/0341434 A1* | 11/2018 | Han | ...................... G06F 3/1225 |
| 2019/0278529 A1* | 9/2019 | Yeung | ................ H04N 1/00079 |

FOREIGN PATENT DOCUMENTS

JP 2013218473 10/2013

OTHER PUBLICATIONS

Nakazawa; JP 2013-218473; Canon Inc, Published Date Oct. 24, 2013; cited paragraphs of the English translation.*

* cited by examiner

*Primary Examiner* — Neil R McLean
(74) *Attorney, Agent, or Firm* — JCIPRNET

(57) ABSTRACT

An information processing apparatus includes: a processor configured to perform grouping on plural devices for each location at which the device is positioned based on position information, which is information related to positions of the plural devices; perform regrouping so that at least one device belonging to each grouped group belongs to another group; and create a schedule of changing software used in the device for each regrouped group.

6 Claims, 11 Drawing Sheets

FIG. 3A

START SCHEDULE SETTING

W1  M1

SCHEDULE SETTING
AVAILABLE PRODUCTS
☐ BBBBB1
☐ BBBBB2
☐ BBBBB3

FIG. 3B

SELECT SOFTWARE AND OPERATION

W2

SCHEDULE SETTING
① PRODUCT AND OPERATION SETTING | ② MULTIFUNCTION MACHINE SETTING | ③ DATE AND TIME SETTING

SELECT PRODUCT
JOB HISTORY DISTRIBUTION
AUTO SCAN
NOTIFICATION FROM ADMINISTRATOR DISPLAY
MULTIFUNCTION MACHINE ADDITION TYPE APPLICATION SETTING
MULTIFUNCTION MACHINE ADDITION TYPE APPLICATION SETTING COPY

M3    M2

SELECT OPERATION
● INSTALL
○ UPDATE
○ UNINSTALL

[NEXT]  [CENCEL]
B1

FIG. 3C

GROUPING SETTING
SELECT TARGET IMAGE FORMING APPARATUS

W3  R1

SCHEDULE SETTING
① PRODUCT AND OPERATION SETTING | ② MULTIFUNCTION MACHINE SETTING | ③ DATE AND TIME SETTING

NOTIFICATION FROM ADMINISTRATOR DISPLAY - INSTALL
INSTALLING PRODUCT IS STARTED.    ☐ ON ☑ OFF
‹DETAILED SETTING›
SCHEDULE GROUPING    PROCESS INTERVAL: [10 ▼]
NUMBER OF GROUPS: [10 ▼]    (MINUTES)
INSTALLATION VERSION: 1.00    GROUPING METHOD: ☐ SUBNET ☐ INSTALLATION PLACE

| | STATE |
|---|---|
| 🖥 | UNINSTALL |
| 🖥 | UNINSTALL |
| 🖥 | UNINSTALL |

R2

[RETURN]  [NEXT]  [CENCEL]
B2

FIG. 3D

START TIME SETTING

W4

SCHEDULE SETTING
① PRODUCT AND OPERATION SETTING | ② MULTIFUNCTION MACHINE SETTING | ③ DATE AND TIME SETTING

[OCTOBER 17, 2018]    [10 ▼] : [30 ▼]
R3

ONLY IN CASE WHERE YOU LOG ON AT ABOVE DATE AND TIME, SET OPERATION IS EXECUTED.
※ PLEASE, DO NOT LOG OFF OR SHUT DOWN PC.
※ IN CASE OF BEING LOGGED ON, THERE IS NO PROBLEM EVEN IN CASE WHERE PC IS IN SLEEP OR DORMANT STATE.
※ IN CASE OF LAPTOP PC, PLEASE CONNECT AC POWER SUPPLY.

Me1

[RETURN]  [REGISTER]  [CENCEL]
B3

FIG. 3E

CHECK CONTENTS

W5

NOTIFICATION FROM ADMINISTRATOR DISPLAY - INSTALL
SCHEDULE IS BEING SET.
SCHEDULED START DATE AND TIME: [OCTOBER 17, 2018]  [10 ▼] : [30 ▼]
INSTALLATION VERSION: 1.00

Me2    R4

| MULTIFUNCTION MACHINE | STATE |
|---|---|
| 🖥 | UNINSTALL |
| 🖥 | UNINSTALL |
| 🖥 | UNINSTALL |

[CHANGE SETTING]  [CANCEL SETTING]  [CLOSE]
B4

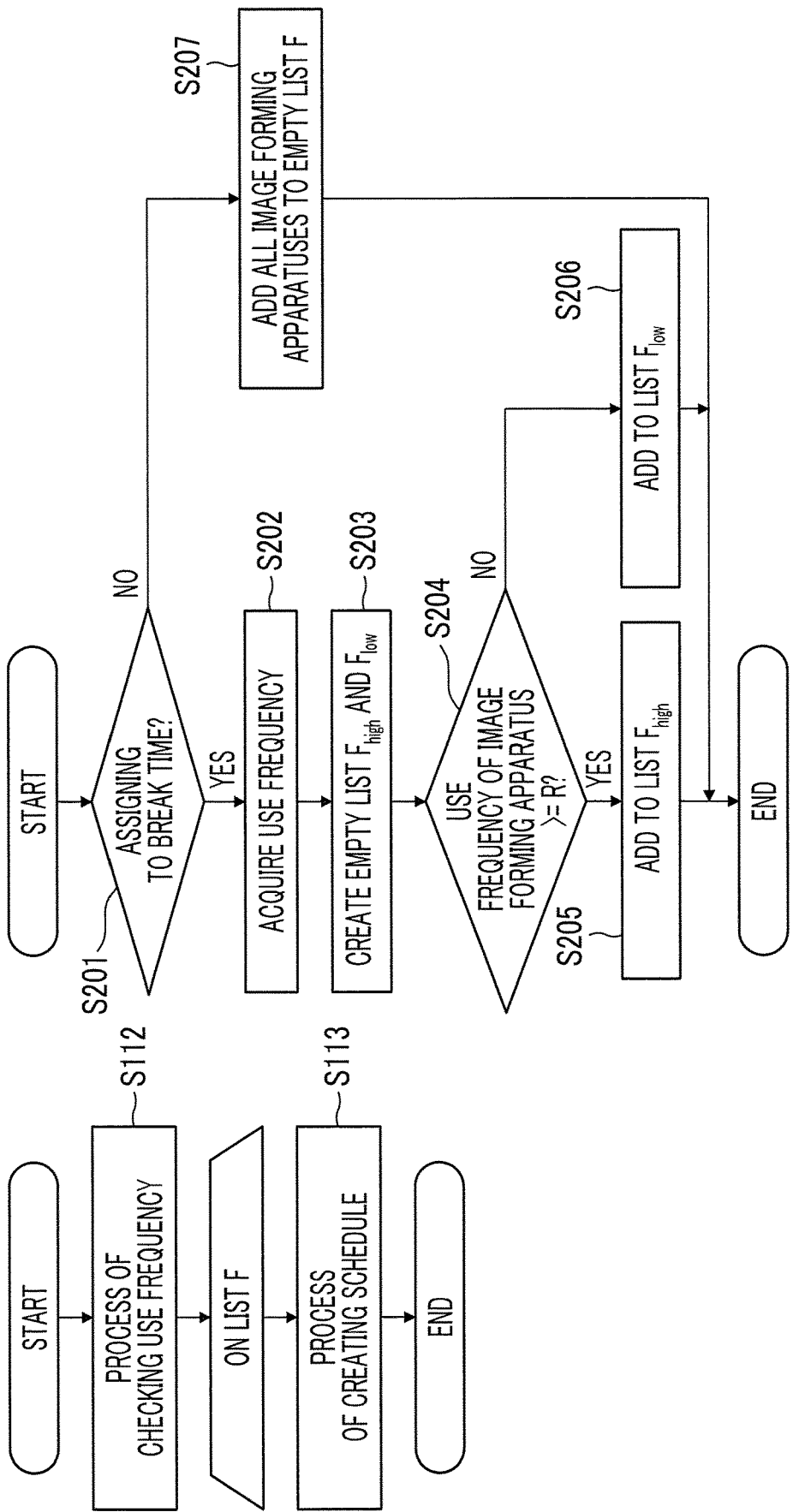

FIG.7

SCHEDULE SETTING — W2

① PRODUCT AND OPERATION SETTING | ② MULTIFUNCTION MACHINE SETTING | ③ DATE AND TIME SETTING

NOTIFICATION FROM ADMINISTRATOR DISPLAY – INSTALL

INSTALLING PRODUCT IS STARTED.   SCHEDULE GROUPING:   ☑ ON   ☐ OFF
〈DETAILED SETTING〉
○ NUMBER OF DEVICES PRIORITY   ○ WORKING TIME PRIORITY — R1
● SET DEVICE HAVING HIGH USE FREQUENCY TO BREAK TIME

INSTALLATION VERSION: 1.0.0    GROUPING METHOD:   ☐ SUBNET   ☑ INSTALLATION PLACE

☑ NUMBER OF MULTIFUNCTION MACHINES (1) | STATE
| UNINSTALL

R2

NUMBER OF SELECTED MULTIFUNCTION MACHINES: 1

[ RETURN ]   [ NEXT ]   [ CANCEL ]
         B2

FIG. 11

SCHEDULE PROCESS IS EXECUTED WITH FOLLOWING CONTENTS.

DATE: XX XX, 20XX (MONTH/DAY/YEAR)

| TIME | DEVICE | INSTALLATION PLACE |
|---|---|---|
| FROM 12:00 | 172.27.xxx.1 | NORTH BUILDING 1F |
|  | 172.27.yyy.1 | SOUTH BUILDING 1F |
| FROM 12:10 | 172.27.xxx.2 | NORTH BUILDING 2F |
|  | 172.27.yyy.2 | SOUTH BUILDING 2F |
| FROM 12:20 | 172.27.xxx.3 | NORTH BUILDING 3F |
|  | 172.27.yyy.3 | SOUTH BUILDING 3F |

Me3

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-021897 filed Feb. 12, 2020.

BACKGROUND (i) Technical Field

The present invention relates to an information processing apparatus, an information processing system, and a non-transitory computer readable medium storing a program.

(ii) Related Art

In some cases, software used in a plurality of devices is changed according to a predetermined schedule. In this case, a user cannot use the device while the software is changed.

JP2013-218473A discloses network device management software which manages an image processing apparatus connected to a network, the software including: means that executes a process of temporarily invalidating an image processing apparatus on a plurality of image processing apparatuses connected to the network, means that inputs one or more sets of image processing apparatuses on which the process of temporarily invalidating the image processing apparatus needs not to be simultaneously executed, and means that controls the execution of the process so that the image processing apparatus on which the process of temporarily invalidating the image processing apparatus is not executed exists in the set of image forming apparatuses.

SUMMARY

In the related art, it is necessary to input a set of devices of which software is to be changed so that a user can use at least one device.

However, for example, in a case where an administrator determines the set of devices and further inputs the set, the case puts a heavy burden on the administrator.

Aspects of non-limiting embodiments of the present disclosure relate to an information processing apparatus or the like capable of more easily determining a set of devices of which software is to be changed, as compared with a case where the set is determined and input.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to perform grouping on a plurality of devices for each location at which the device is positioned based on position information, which is information related to positions of the plurality of devices; perform regrouping so that at least one device belonging to each grouped group belongs to another group; and create a schedule of changing software used in the device for each regrouped group.

BRIEF DESCRIPTION OF THE DRAWINGS

Exemplary embodiment(s) of the present invention will be described in detail based on the following figures, wherein:

FIGS. 3A to 3E are diagrams illustrating screens displayed on a display mechanism in a case where a terminal device changes software;

FIG. 6A is a flowchart illustrating in detail processes in step S112 and step S113 in FIG. 5; and FIG. 6B is a flowchart illustrating a process in step S112 in FIG. 5 in more detail;

FIG. 7 is a diagram illustrating a setting screen when a process of assigning an image forming apparatus having a high frequency of use to a break time is performed;

FIG. 11 is a diagram illustrating a mail notifying a schedule in step S117 in FIG. 5.

DETAILED DESCRIPTION

Hereinafter, exemplary embodiments of the present invention will be described in detail with reference to drawings.

<Description of Entire Information Processing System>

Figure 1:
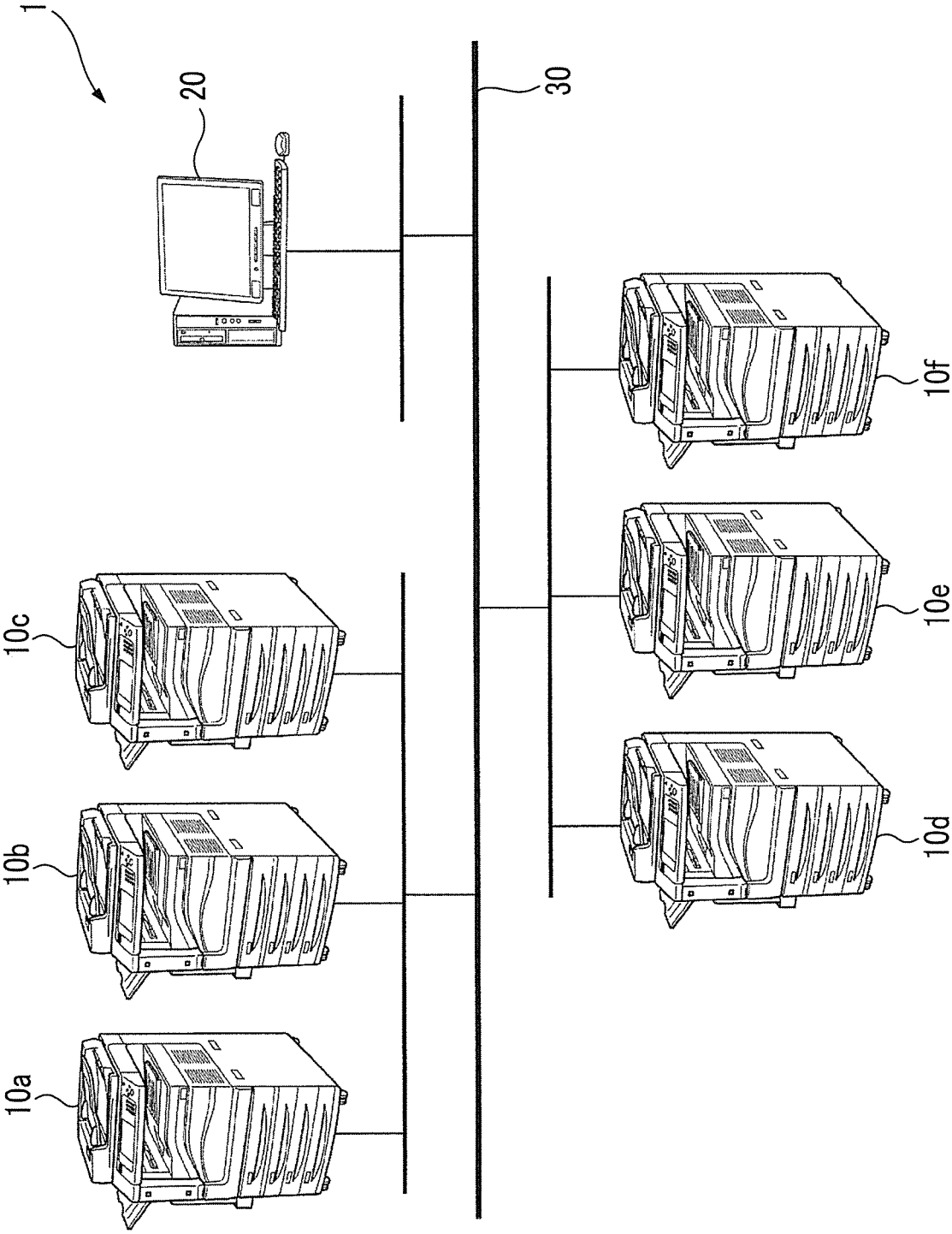
FIG. 1 is a diagram illustrating a configuration example of an information processing system according to the present exemplary embodiment.

FIG. 1 is a diagram illustrating a configuration example of an information processing system 1 according to the present exemplary embodiment.

As illustrated, the information processing system 1 according to the present exemplary embodiment is configured to include image forming apparatuses 10a, 10b, and 10c, image forming apparatuses 10d, 10e, and 10f, and a terminal device 20 being connected with each other via a network 30. In a case where the image forming apparatuses 10a, 10b, 10c, 10d, 10e, and 10f are not respectively distinguished, the image forming apparatuses 10a, 10b, 10c, 10d, 10e, and 10f may be simply referred to as an image forming apparatus 10 hereinafter.

Although only six image forming apparatuses 10 and one terminal device 20 are illustrated in FIG. 1, any number may be used.

The image forming apparatus 10 is an example of a device. The image forming apparatus 10 has a printer function. That is, the image forming apparatus 10 can form an image on a recording medium such as paper and output the image as a printing medium. In addition to the printer function, the image forming apparatus 10 has other age processing functions such as a scanner function and a facsimile function. Although details will be described below, these functions are realized by software which realize predetermined functions operating.

Figure 2:
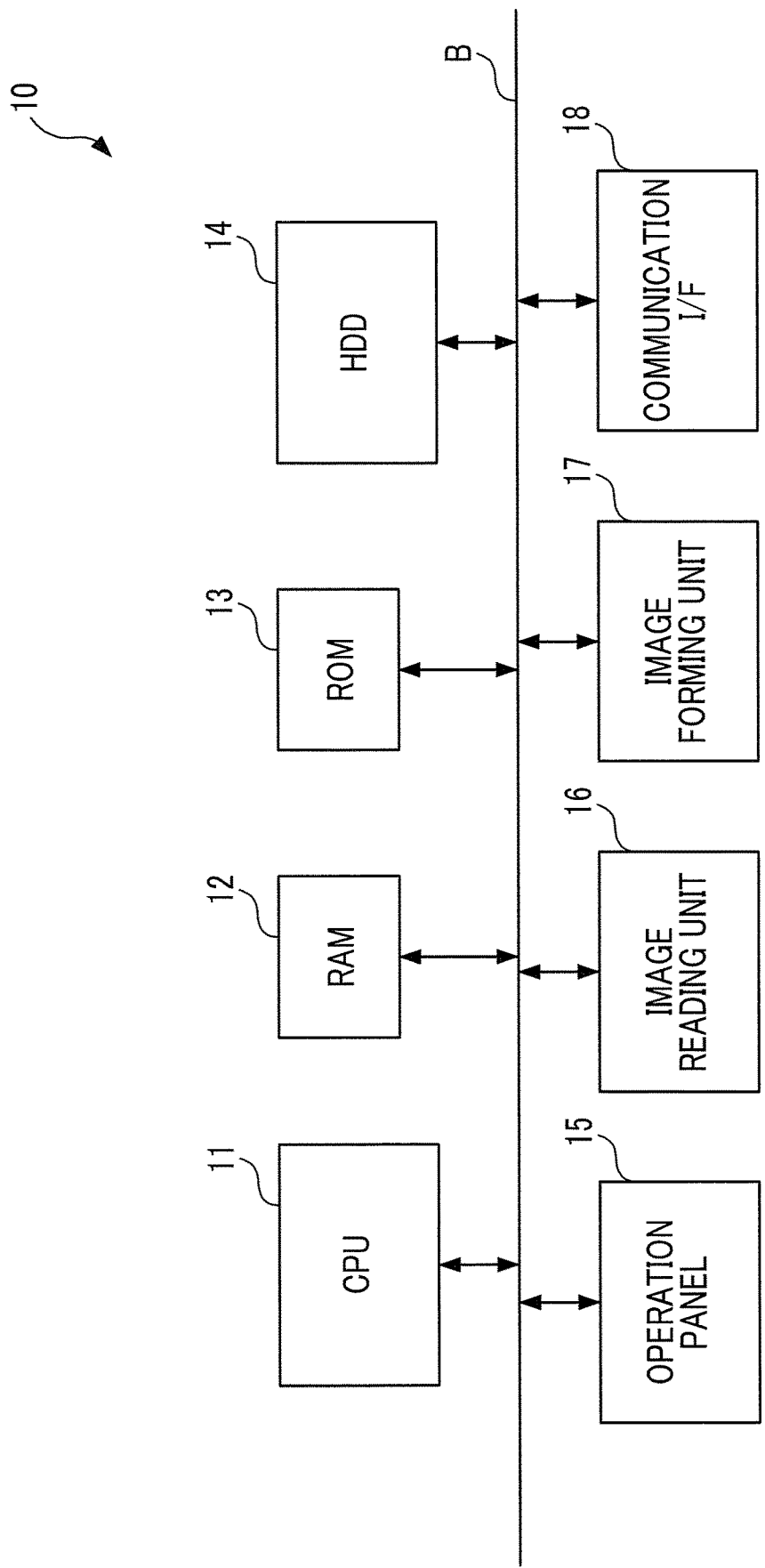
FIG. 2 is a diagram illustrating a hardware configuration example of an image forming apparatus.

FIG. 2 is a diagram illustrating a hardware configuration example of the image forming apparatus 10.

As illustrated, the image forming apparatus 10 includes a central processing unit (CPU) 11, a random access memory (RAM) 12, a read only memory (ROM) 13, a hard disk drive (HDD) 14, and an operation panel 15, an image reading unit 16, an image forming unit 17, and a communication I/F 18. These units exchange necessary data via a bus B.

The RAM 12 is a memory used as a working memory of the CPU 11 and the like.

The ROM 13 is a memory which stores various programs executed by the CPU 11 and the like.

The HDD 14 is, for example, a magnetic disk device which stores image information read by the image reading unit 16, image information used for image formation by the image forming unit 17, and the like.

The operation panel 15 is, for example, a touch panel which displays various types of information or receives an operation input from a user. Therefore, a display mechanism includes a display unit such as a liquid crystal panel which displays contents (information contents) as an image in a predetermined area, and has a function of detecting a position, when a finger or a contact object typified by a stylus pen touches the liquid crystal panel, at which the contact object is in contact with the liquid crystal panel. The touch panel in the present exemplary embodiment is not particularly limited, and various methods such as a resistance film method and a capacitance method can be used.

The image reading unit 16 reads an image recorded on an original document. Here, the image reading unit 16 is, for example, a scanner, and a CCD method in which reflected light for light emitted from a light source to an original document is reduced by a lens and received by charge coupled devices (CCDs) or a CIS method in which reflected light for light emitted sequentially from a LED light source to an original document is received by a contact image sensor (CIS) may be used.

The image forming unit 17 is an example of a printing mechanism which forms an image on a recording medium. Here, the image forming unit 17 is, for example, a printer, and an electrophotographic method in which toner attached to a photoconductor is transferred to a recording medium such as paper to form an image, or an inkjet method in which an image is formed by ejecting ink onto a recording medium may be used.

The communication I/F 18 transmits and receives various types of information to and from other apparatuses via the network.

The terminal device 20 is an example of an information processing apparatus, and manages software which operates in the image forming apparatus 10. The terminal device 20 newly introduces, updates, or deletes the software as a change. These can be referred to as installing, updating, and uninstalling software, respectively.

The terminal device 20 is, for example, a general-purpose personal computer (PC). The terminal device 20 manages software of the image forming apparatus 10 by operating various application software under management of an operating system (OS).

The terminal device 20 includes a CPU which is a calculation section, a main memory which is a storage section, and a storage such as an HDD or a solid state drive (SSD). Here, the CPU is an example of a processor and executes various types of software such as an OS (basic software) and application software. The main memory is a storage area for storing various types of software and data used for executing the software, and the storage is a storage area for storing input data to the various types of software, output data from the various types of software, and the like.

Further, the terminal device 20 includes a communication interface (hereinafter, referred to as "communication I/F") for performing communication with an outside, a display mechanism consisting of a video memory, a display, or the like, and an input device such as a keyboard, a mouse, a touch panel, or a stylus pen.

The network 30 is a communication section used for information communication between the image forming apparatus 10 and the terminal device 20, and is, for example, a local area network (LAN) or the Internet.

<Outline of Operation of Information Processing System 1>

Next, an outline operation of the information processing system 1 will be described.

In a case where changing software, the terminal device 20 creates a schedule for changing the software. Although details will be described below, the terminal device 20 acquires state information indicating a state of the image forming apparatus 10. Based on this state information, the schedule for changing the software is created. In this schedule, at least one image forming apparatus 10 operates for each predetermined location at which the image forming apparatus 10 is set. Based on this schedule, the terminal device 20 changes the software introduced into the image forming apparatus 10.

FIGS. 3A to 3E are diagrams illustrating screens displayed on a display mechanism in a case where the terminal device 20 changes software.

FIG. 3A is a screen for starting a setting of a schedule. This screen is displayed in the window W1, and an administrator who manages the software selects a schedule setting from a menu M1 in the window W1.

FIG. 3B illustrates a screen for selecting software and operation as a screen for setting the schedule. This screen is displayed as a window W2 when the setting of the schedule in FIG. 3A is selected. In this window W2, a menu M2 and a menu M3 are displayed. The menu M2 displays a list of pieces of software introduced into the image forming apparatus 10. The administrator selects a target software from the menu M2. Further, the menu M3 displays a list of operations which can be performed on the software. The administrator selects an operation on the software from the menu M3. Here, the operation can be selected from "install", "update", and "uninstall".

FIG. 3C illustrates a screen for setting grouping and selecting the target image forming apparatus 10. This screen is displayed as a window W3 when a button B1 in FIG. 3B is pressed. In this window W3, a setting field R1 and a setting field R2 are displayed.

In the setting field R1, a setting for grouping can be performed. Here, for example, whether or not to perform grouping is set. That is, in a case where ON is selected, grouping is performed, and in a case where OFF is selected, grouping is not performed. In addition, the number of groups, which is the number of groupings, a process interval for setting a time at which software is changed for one group, and a grouping method of selecting a grouping method can be set.

In the setting field R2, the target image forming apparatus 10 can be selected when the software is changed.

FIG. 3D illustrates a screen for setting a start time. This screen is displayed as a window W4 when a button B2 in FIG. 3C is pressed. In this window W4, a setting field R3 and a message Me1 are displayed. In the setting field R3, a start time when the software is changed can be set. Further, the message Me1 displays a caution when the software is changed.

FIG. 3E illustrates a screen for checking contents. This screen is displayed as a window W5 when a button B3 in FIG. 3D is pressed. In this window W5, a message Me2 and a target list R4 are displayed. The message Me2 displays a scheduled start date and time in a case where the software is changed. Further, in the target list R4, a list of the image forming apparatuses 10 of which software is to be changed is displayed. In a case where a button B4 is pressed, it is possible to change a setting of the schedule.

<Description of Functional Configuration of Information Processing System 1>

Next, the information processing system 1 will be described in detail.

Figure 4:
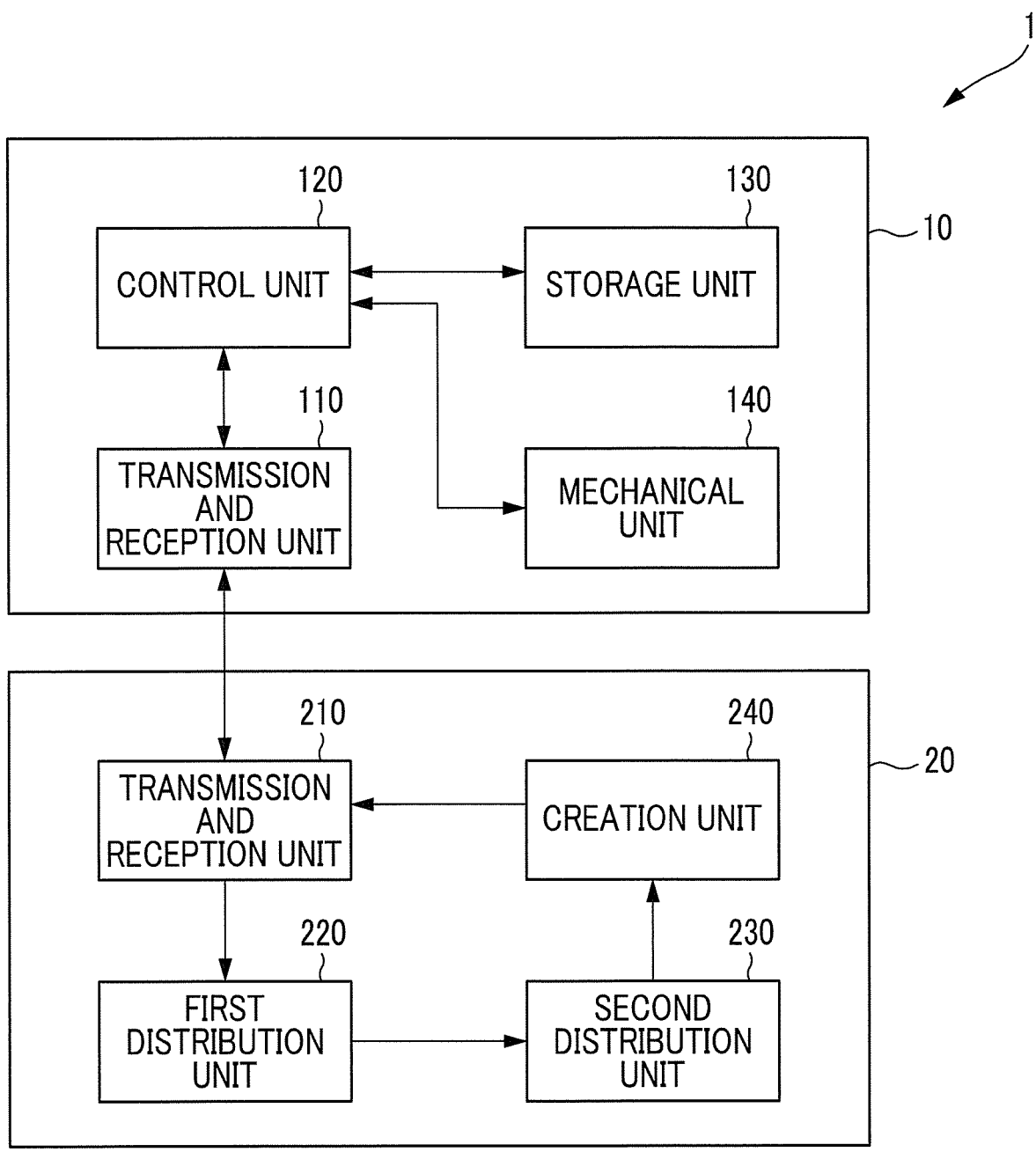
FIG. 4 is a block diagram illustrating a functional configuration example of the information processing system.

FIG. 4 is a block diagram illustrating a functional configuration example of the information processing system 1.

Here, among various functions of the information processing system 1, functions related to the present exemplary embodiment are selected and illustrated.

The image forming apparatus 10 of the information processing system 1 includes a transmission and reception unit 110 which transmits and receives information to and from an external device, a control unit 120 which controls the image forming apparatus 10, a storage unit 130 which stores software, and a mechanical unit 140 which realizes functions of the image forming apparatus 10.

The transmission and reception unit 110 receives an instruction of changing a setting of software, from the terminal device 20. The transmission and reception unit 110 corresponds to, for example, the communication I/F 18 or the CPU 11.

The control unit 120 controls the entire image forming apparatus 10. Here, when the terminal device 20 gives an instruction of changing a setting of software, the software is changed and stored in the storage unit 130. The control unit 120 corresponds to the CPU 11, the RAM 12, and the ROM 13.

The storage unit 130 stores software. The storage unit 130 corresponds to the HDD 14.

The mechanical unit 140 is, for example, the touch panel, the scanner, the printing mechanism, or the like described above. The mechanical unit 140 corresponds to the operation panel 15, the image reading unit 16, and the image forming unit 17.

The terminal device 20 includes a transmission and reception unit 210 which transmits and receives information to and from an external device, a first distribution unit 220 which performs a first grouping, a second distribution unit 230 which performs a second grouping, and a creation unit 240 which creates a schedule of changing software.

The transmission and reception unit 210 transmits and receives information to and from the image forming apparatus 10 via the network 30.

Based on position information which is information related to positions of a plurality of image forming apparatuses 10, the first distribution unit 220 performs grouping for each location at which the plurality of image forming apparatuses 10 are located. Here, "position information" is information on a place at which the image forming apparatus 10 is disposed. The place at which the image forming apparatus 10 is disposed includes an administrative place in addition to an installation place at which the image forming apparatus 10 is installed. The place at which the image forming apparatus 10 is installed is, for example, a room at which the image forming apparatus 10 is installed, the number of floors, an organization, or the like. Further, "grouping by location" means, for example, grouping by organization such as a department. The administrative place is, for example, an IP address given to the image forming apparatus 10. Further, "grouping by location" means, for example, grouping for each subnet.

The second distribution unit 230 performs grouping again so that at least one of the image forming apparatuses 10 belonging to each group grouped by the first distribution unit 220 belongs to another group. For example, the second distribution unit 230 performs grouping again so that the image forming apparatuses 10 belonging to the group grouped by the first distribution unit 220 do not all belong to the same group.

At this time, the second distribution unit 230 uses state information, which is information related to a use state of the plurality of image forming apparatuses 10, to perform the grouping again. The "state information" is information indicating a state in which the image forming apparatus 10 is used. The state information is, for example, ON or OFF of a power source of the image forming apparatus 10, a frequency of use of the image forming apparatus 10, the number of users who use the image forming apparatus 10, a time slot in which the image forming apparatus 10 is used, or the like. That is, the second distribution unit 230 performs grouping again in consideration of the use state of the image forming apparatus 10.

The creation unit 240 creates a schedule of changing software used in the image forming apparatus 10 for each group regrouped by the second distribution unit 230. In this case, at least one of the image forming apparatuses 10 belonging to each group grouped by the first distribution unit 220 does not change the software at the same time. That is, the at least one image forming apparatus 10 is in a ready state for use.

At this time, the creation unit 240 creates a schedule by using the state information described above.

Next, an operation of the information processing system 1 will be described.

Figure 5:
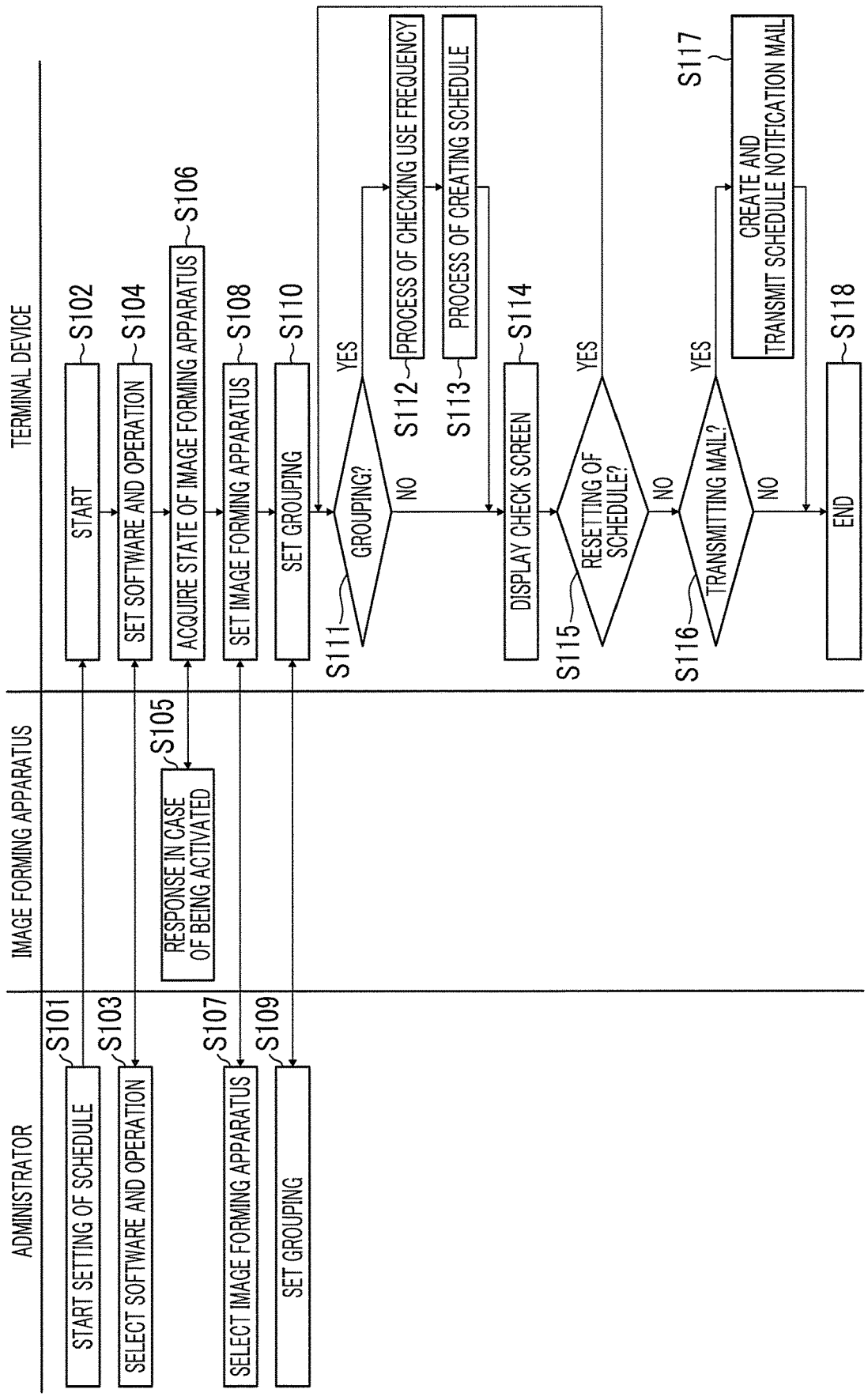
FIG. 5 is a sequence diagram illustrating an operation of the information processing system.

FIG. 5 is a sequence diagram illustrating an operation of the information processing system 1.

The illustrated sequence diagram indicates an operation of each of an administrator, the image forming apparatus 10, and the terminal device 20.

Here, first, the administrator starts a setting of a schedule for changing software (step S101). The terminal device 20 starts the setting of the schedule (step S102). In practice, the terminal device 20 operates application software for setting the schedule, and the administrator operates the terminal device 20 as described with reference to FIG. 3A.

Next, the administrator selects target software and an operation to be performed on the software (step S103). The terminal device 20 sets the target software and the operation (step S104). In practice, the administrator operates the terminal device 20 as described with reference to FIG. 3B.

The terminal device 20 inquires of the image forming apparatus 10, and in a case of being activated, the image forming apparatus 10 responds with a state of the image forming apparatus 10 (step S105). Accordingly, the terminal device 20 acquires the state of the image forming apparatus 10 (step S106). The state of the image forming apparatus 10 is one of being activated, being used by a user, and being stopped. The terminal device 20 determines each state of the terminal device 20 while being activated or being used by a user based on the response from the image forming apparatus 10. On the other hand, since there is no response in a case where the image forming apparatus 10 is stopped, the terminal device 20 determines that the terminal device 20 is in a stopped state.

Next, the administrator selects the image forming apparatus 10 of which software is to be changed (step S107). The terminal device 20 sets the target image forming apparatus (step S108). Further, the administrator sets grouping (step S109). The terminal device 20 sets the grouping (step S110). In practice, the administrator operates the terminal device 20 as described with reference to FIG. 3C. Further, the administrator also performs the operation as described in FIG. 3D on the terminal device 20 to set a start time of the software.

The terminal device 20 determines whether or not perform the setting for grouping (step S111).

As a result, in a case where the grouping is set (Yes in step S111), a process of checking a frequency of use of the image forming apparatus 10 is performed (step S112). The process in which the terminal device 20 checks the frequency of use will be described in detail below.

The terminal device 20 creates a schedule (step S113). The process in which the terminal device 20 creates the schedule will also be described in detail below.

After step S113 and in a case where the setting is such that the grouping is not performed (No in step S111), the terminal device 20 displays a screen for checking contents of the schedule (step S114). This is the screen as illustrated in FIG. 3E.

The terminal device 20 determines whether or not there is a setting change of the schedule (step S115).

As a result, in a case where the setting of the schedule is changed (Yes in step S115), the process returns to step S111.

On the other hand, in a case where the setting of the schedule is not changed (No in step S115), it is determined whether or not to transmit a mail notifying the user who uses the image forming apparatus 10 of the schedule in which the software is changed (step S116). The administrator can set the determination in advance.

In a case of transmitting the mail (Yes in step S116), the mail notifying the schedule is created and transmitted (step S117).

A series of processes is completed (step S118). In addition, in a case where the mail is not transmitted (No in step S116), the process is completed in the same manner.

FIGS. 6A and 6B are flowcharts for explaining the process in step S112 in FIG. 5 in more detail.

Here, as illustrated in FIG. 6A, the terminal device 20 creates a list F in a case of performing the process of checking the frequency of use of the image forming apparatus 10 in step S112. The terminal device 20 uses the list F to perform the process of creating the schedule in step S113.

FIG. 6B is a flowchart illustrating the process in step S112 in detail.

It is determined whether or not to perform a process of assigning the image forming apparatus 10 having a high frequency of use to a break time (step S201).

FIG. 7 is a diagram illustrating a setting screen when a process of assigning an image forming apparatus 10 having a high frequency of use to a break time is performed.

The screen in FIG. 7 corresponds to the screen in FIG. 3C, and in the setting field R1, it is possible to select "set device having high frequency of use to break time" as detailed setting.

Returning to FIGS. 6A and 6B, in a case where it is determined that the process is performed in step S201 (Yes in step S201), the terminal device 20 acquires a frequency of use from each target image forming apparatus 10 (step S202). The frequency of use is, for example, the number of times the image forming apparatus 10 is used, the number of printed sheets, a total used time, the number of used persons, and the like.

Next, the terminal device 20 creates empty lists $F_{high}$ and $F_{low}$ (step S203). In this case, the list F includes two of the list $F_{high}$ and the list $F_{low}$.

The terminal device 20 determines whether or not the frequency of use of the image forming apparatus 10 is equal to or higher than a predetermined threshold value R (step S204).

In a case where the frequency of use is high so the frequency of use is equal to or higher than the predetermined threshold value R (Yes in step S204), the image forming apparatus 10 is added to the list $F_{high}$ (step S205).

On the other hand, in a case where the frequency of use is low so the frequency of use is less than the predetermined threshold value R (No in step S204), the image forming apparatus 10 is added to the list $F_{low}$ (step S206).

Accordingly, the image forming apparatuses 10 having the relatively high frequency of use is collected to the list $F_{high}$ and the image forming apparatuses 10 having a relatively low frequency of use is collected to the list $F_{low}$.

In addition, in a case where it is determined that the terminal device 20 does not perform the process on the image forming apparatus 10 in step S201 (No in step S201), all the target image forming apparatuses 10 are added to the empty list F (step S207). Accordingly, one list F is created.

Figure 8:
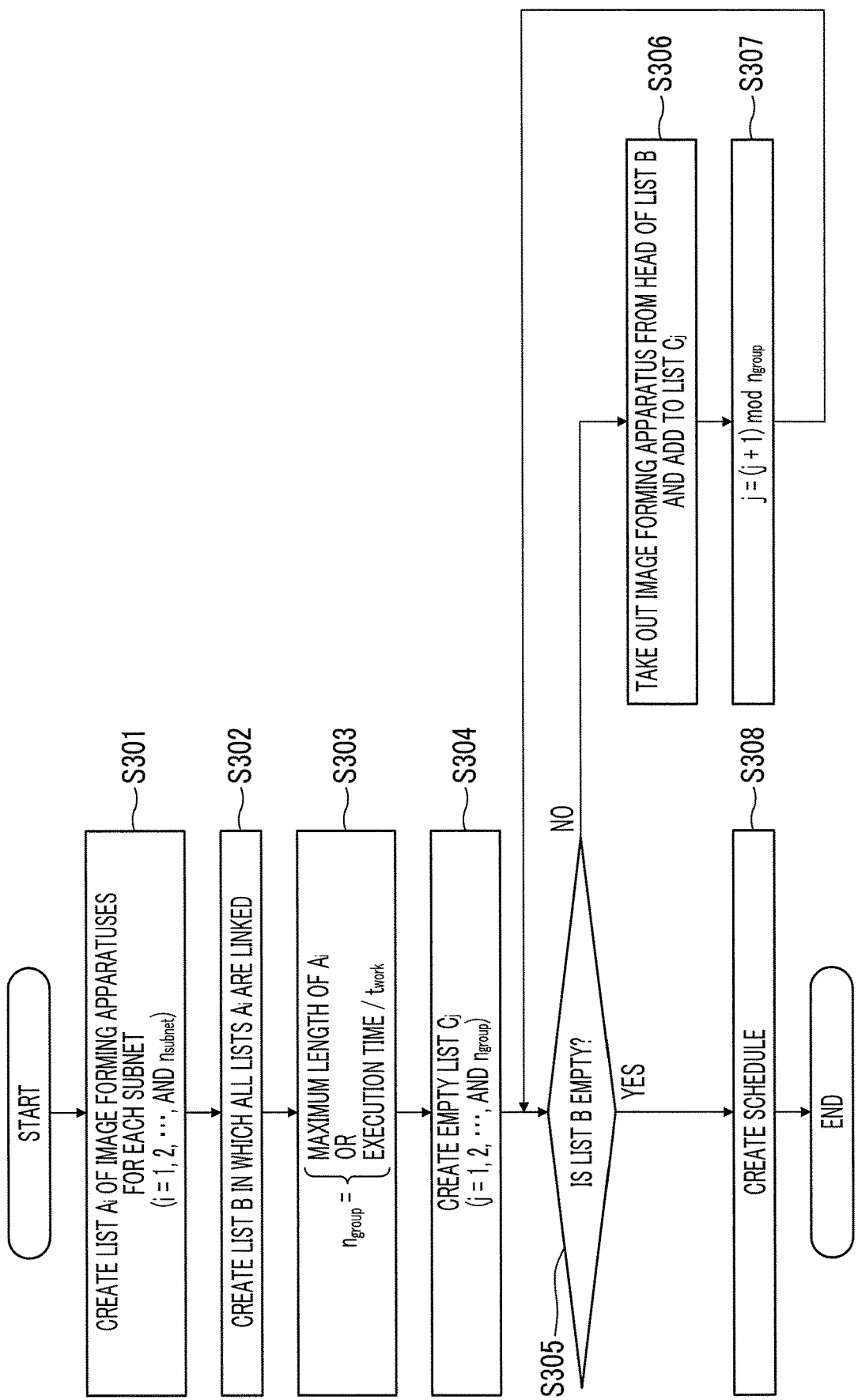
FIG. 8 is a flowchart illustrating a process in step S113 in FIG. 5 in more detail.

FIG. 8 is a flowchart illustrating the process in step S113 in FIG. 5 in more detail.

First, based on the list F, the terminal device 20 creates a list $A_i$ (i=1, 2, . . . , and $n_{subnet}$) of the image forming apparatus 10 for each subnet (step S301). Here, $n_{subnet}$ is the number of subnets, and the lists $A_1$ to $A_{nsubnet}$ are created in accordance with $n_{subnet}$ which is the number of subnets. This corresponds to a process in which the first distribution unit 220 groups the plurality of image forming apparatuses 10 for each subnet by using information on the subnet as position information. This also corresponds to the first grouping.

The terminal device 20 creates a list B in which all the lists $A_i$ are linked (step S302).

Further, the terminal device 20 determines $n_{group}$ which is the number of groups for grouping again (step S303). The number of groups $n_{group}$ is any one of a maximum length of $A_i$ and a value obtained by dividing an execution time at which a change process of software is executed by one working time $t_{work}$ which is execution time/$t_{work}$.

The terminal device 20 creates an empty list $C_j$ (j=1, 2, . . . , and $n_{group}$) (step S304). Here, empty lists $C_1$ to $C_{ngroup}$ are created depending on the number of groups $n_{group}$.

Next, the terminal device 20 determines whether or not the list B is empty (step S305). In a case where the list B is empty, the case means that all the image forming apparatuses 10 are regrouped and the creation of the list $C_j$ is completed.

As a result, in a case where the list B is not empty (No in step S305), the terminal device 20 takes out the image forming apparatus 10 from the head of the list B and adds the image forming apparatus 10 to the list $C_j$ (step S306). At this time, j is determined by calculating an equation of j=(j+1) mod $n_{group}$ (step S307). After that, the process returns to step S305. That is, the processes in steps S306 and S307 are repeated until the list B becomes empty. This corresponds to the process in which the second distribution unit 230 performs grouping again. This also corresponds to the second grouping.

On the other hand, in a case where the list B is empty (Yes in step S305), the terminal device 20 creates a schedule based on the list $C_j$ (step S308). This schedule is a schedule for changing software of the image forming apparatuses 10 in the list $C_j$ for the number of groups $n_{group}$ times at $t_{work}$ intervals from a start date and time. In this schedule, for example, first, the software of the image forming apparatus 10 in the list $C_1$ is changed for the first time. Next, the software of the image forming apparatus 10 in the list $C_2$ is changed for the second time. This process is sequentially repeated at $t_{work}$ intervals from the start date and time, and the software of the image forming apparatus 10 in the last list $C_{ngroup}$ is changed for the $n_{group}$ time.

This corresponds to the process in which the creation unit 240 creates the schedule.

Figure 9:
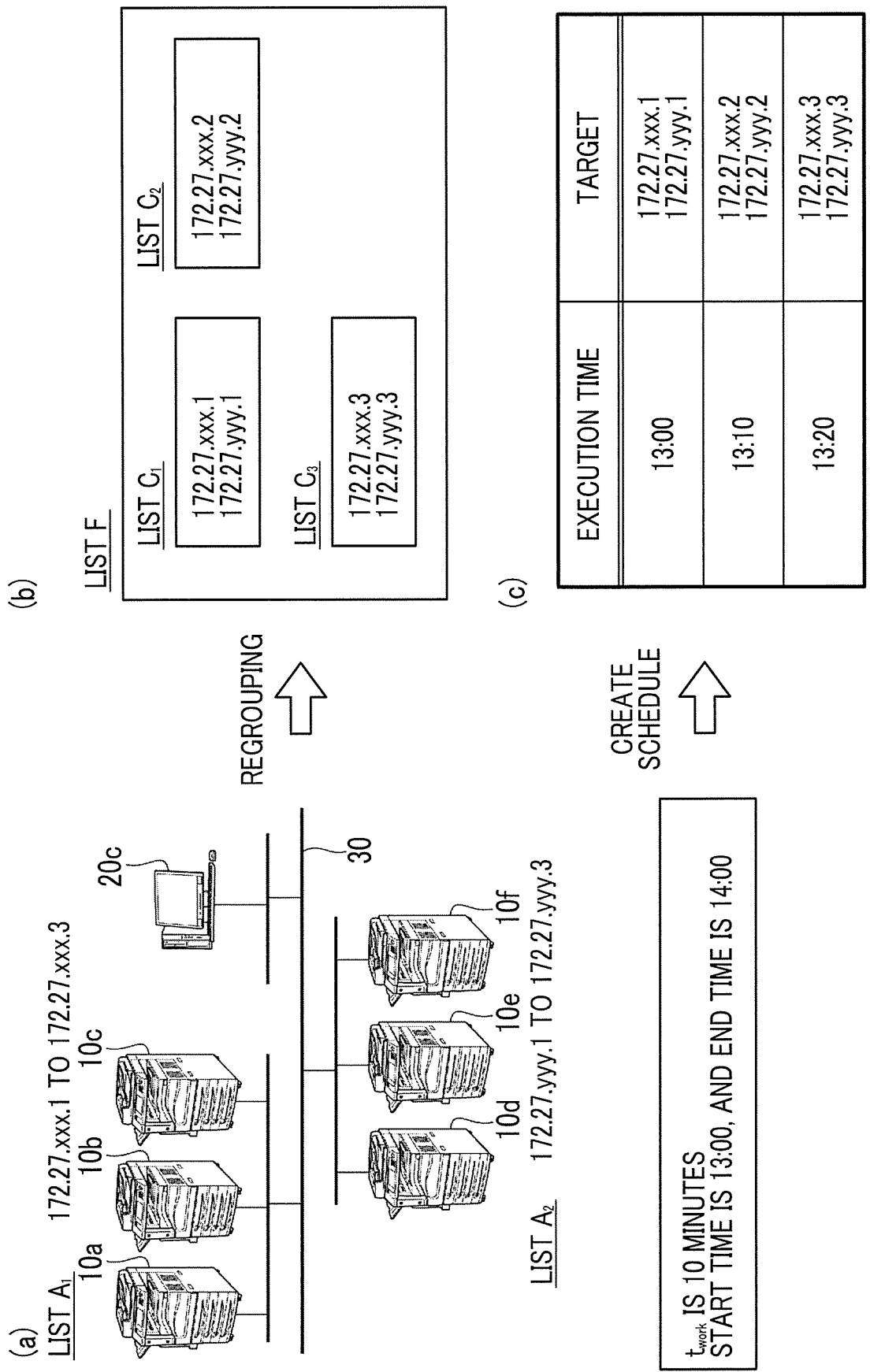
FIG. 9 is a first example illustrating a result of the processes performed in FIGS. 6A, 6B, and 8.

FIG. 9 is a first example illustrating a result of the processes performed in FIGS. 6A, 6B, and 8.

Here, the result in a case where the process of assigning the image forming apparatus 10 having a high frequency of use to a break time is not performed in step S201 in FIG. 6B (No in step S201) is illustrated.

A part (a) in FIG. 9 illustrates that the list $A_1$ and the list $A_2$ are created as the list $A_i$ illustrated in step S301 in FIG. 8. The three image forming apparatuses 10a, 10b, and 10c having subnets of 172.27.xxx.1 to 172.27.xxx.3 belong to the list $A_1$. Further, the three image forming apparatuses 10d, 10e, and 10f having subnets of 172.27.yyy.1 to 172.27.yyy.3 belong to the list $A_2$. As described above, in the first grouping, information on the subnet is used to group the plurality of image forming apparatuses 10 for each subnet.

Further, a part (b) in FIG. 9 illustrates that the list $C_1$, the list $C_2$, and the list $C_3$ are created as the list $C_j$ illustrated in steps S305 to S307 in FIG. 8. The two image forming apparatuses 10a and 10d having the subnets of 172.27.xxx.1 and 172.27.yyy.1 belong to the list C. In addition, the two image forming apparatuses 10b and 10e having the subnets of 172.27.xxx.2 and 172.27.yyy.2 belong to the list $C_2$. Further, the two image forming apparatuses 10c and 10f having the subnets of 172.27.xxx.3 and 172.27.yyy.3 belong to the list $C_3$. As described above, in the second grouping, the grouping is performed again so that at least one of the image forming apparatuses 10 belonging to each group grouped in the first grouping belongs to another group.

As illustrated in a part (c) in FIG. 9, a schedule for processing the software change is created in order of the list $C_1$, the list $C_2$, and the list $C_3$. This case illustrates a schedule when $t_{work}$ is 10 minutes, a start time is 13:00, and an end time is 14:00. Accordingly, at least one image forming apparatus 10 in the group grouped by the first grouping can be used even during execution of the schedule. For example, from 13:00 to 13:10, the two image forming apparatuses 10b and 10c having the subnets of 172.27.xxx.2 and 172.27.xxx.3 in the list $A_1$ are available. Further, the two image forming apparatuses 10e and 10f having the subnets of 172.27.yyy.2 to 172.27.yyy.3 in the list $A_2$ are available.

Figure 10:
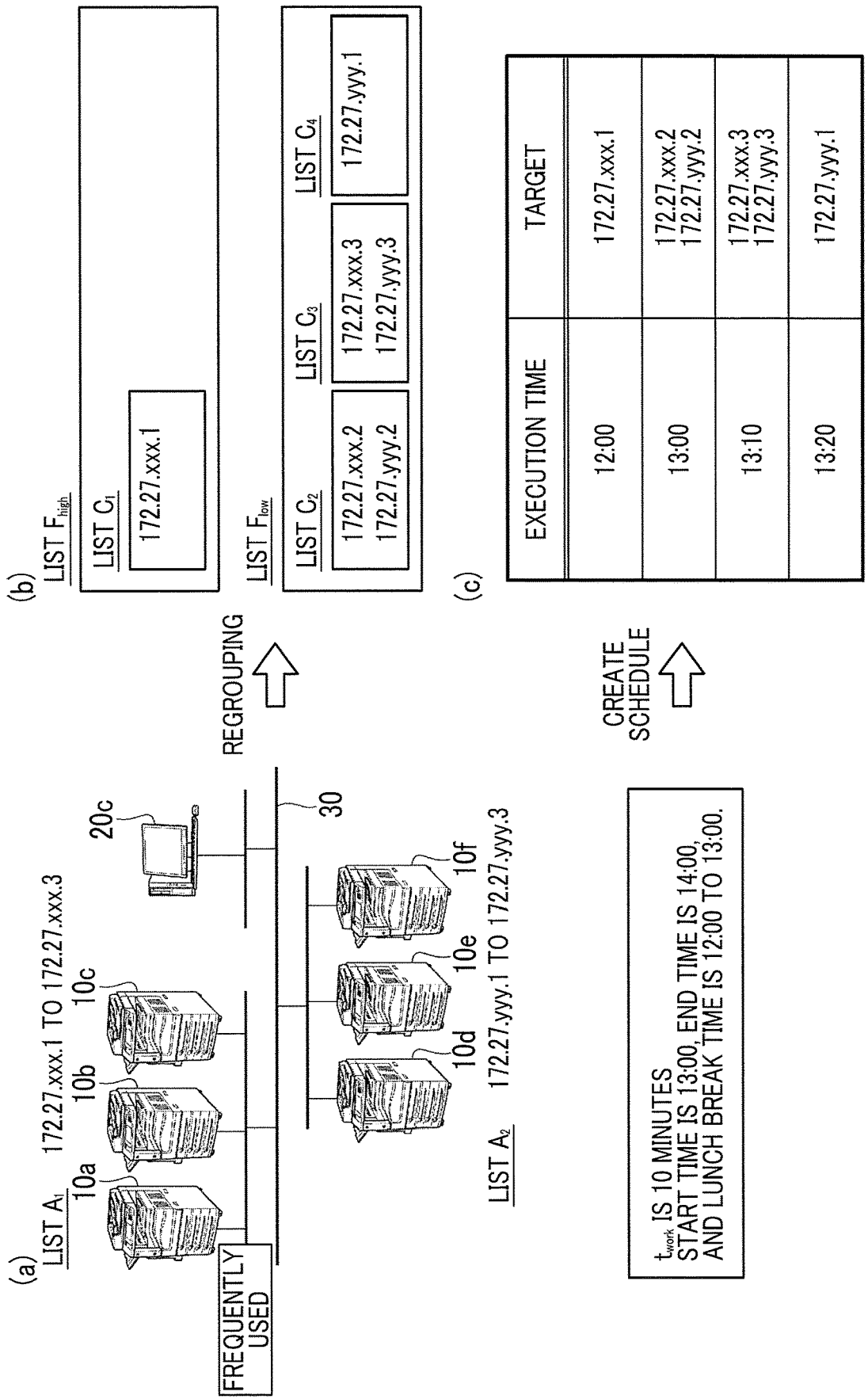
FIG. 10 is a second example illustrating the result of the processes performed in FIGS. 6A, 6B, and 8.

FIG. 10 is a second example illustrating a result of the processes performed in FIGS. 6A, 6B, and 8.

In this example, the second distribution unit 230 uses frequencies of use of the image forming apparatuses 10 as state information, and collects the image forming apparatuses 10 having higher frequencies of use into at least one group. Further, the second distribution unit 230 groups again devices other than the devices having the higher frequencies of use. The creation unit 240 uses the frequency of use of the device as the state information, and creates a schedule for assigning a time slot at which the software is changed, in accordance with the frequency of use of the device.

Here, the result in a case where the process of assigning the image forming apparatus 10 having a high frequency of use to a break time is performed in step S201 in FIG. 6B (Yes in step S201) is illustrated.

A part (a) in FIG. 10 illustrates that the list $A_1$ and the list $A_2$ are created as the list $A_i$ illustrated in step S301 in FIG. 8. This has the same manner as the case in the part (a) in FIG. 9. Meanwhile, in this case, it is assumed that the image forming apparatus 10a having the subnet of 172.27.xxx.1 has a relatively high frequency of use and the other image forming apparatuses 10a have relatively low frequencies of use.

Further, a part (b) in FIG. 10 illustrates that the list $C_1$, the list $C_2$, the list $C_3$, and the list $C_4$ are created as the list $C_j$ illustrated in steps S305 to S307 in FIG. 8. The one image forming apparatus 10a having the subnet of 172.27.xxx.1 belongs to the list $C_1$. That is, the list $C_1$ includes the image forming apparatus 10 having the relatively high frequency of use in the list $F_{high}$. The two image forming apparatuses 10b and 10e having the subnets of 172.27.xxx.2 and 172.27.yyy.2 belong to the list $C_2$. Further, the two image forming apparatuses 10c and 10f having the subnets of 172.27.xxx.3 and 172.27.yyy.3 belong to the list $C_3$. In addition, the one image forming apparatus 10d having the subnet of 172.27.yyy.1 belongs to the list $C_4$. Therefore, the image forming apparatuses 10 having the relatively low frequencies of use in the list $F_{low}$ belong to the list $C_2$, $C_3$, and $C_4$. As described above, in the second grouping, the image forming apparatus 10 having the relatively high frequency of use and the image forming apparatus 10 having the relatively low frequency of use are respectively grouped again so as to be separated.

As illustrated in a part (c) in FIG. 10, a schedule for processing the software change is created in order of the list $C_1$, the list $C_2$, the list $C_3$, and the list $C_4$. This case illustrates a schedule when $t_{work}$ is 10 minutes, a start time is 13:00, and an end time is 14:00. Accordingly, in the same manner as the case in FIG. 9, at least one image forming apparatus 10 grouped by the first grouping can be used even during execution of the schedule. Further, here, the image forming apparatus 10a having the relatively high frequency of use is assigned during a lunch break time of 12:00 to 13:00. Accordingly, the image forming apparatus 10a can be used at any time slot except during the lunch break.

FIG. 11 is a diagram illustrating a mail notifying the schedule in step S117 in FIG. 5.

Here, as a message Me3, an example in which the contents of the schedule described in the part (c) in FIG. 9 are notified together with a text of "Schedule process is executed with following contents." and a place at which the image forming apparatus 10 is installed is described.

With the terminal device 20 described above, it is possible to more easily determine a set of devices of which software is to be changed, as compared with a case where the set is determined and input. At least one image forming apparatus 10 can be used for each location.

The set is dynamically determined according to a frequency of use of the image forming apparatus. Further, the user can know the schedule of the software change by receiving the notification, and can determine which image forming apparatus 10 can be used at what time.

In the example described above, the device is the image forming apparatus 10, but the device is not limited to this. That is, any device may be used as long as the software is changed by an operation of another device. Examples of the device include ordinary PCs, mobile phones, smartphones, tablets, and network devices such as wireless LAN routers.

<Description of Program>

Here, the process performed by the terminal device 20 of the present exemplary embodiment described above is prepared, for example, as a program such as application software. The process is realized by cooperation of application software and hardware resources.

Therefore, the program which executes the process performed by the terminal device 20 according to the present exemplary embodiment can also be regarded as a program causing a computer to realize: a first distribution function of performing grouping on the plurality of image forming apparatuses 10 for each location at which the image forming apparatus 10 is positioned based on position information, which is information related to positions of the plurality of image forming apparatuses 10; a second distribution function of performing regrouping so that at least one image forming apparatus 10 belonging to each group grouped by the first distribution function belongs to another group; and a creation function of creating a schedule of changing software used in the image forming apparatus 10 for each group regrouped by the second distribution function.

A program for realizing the present exemplary embodiment can be provided by a communication section as well as provided by being stored in a recording medium such as a CD-ROM or the like.

Although the present exemplary embodiments are described above, a technical scope of the exemplary embodiments of the present invention is not limited to the scope described in the exemplary embodiments described above. Various modifications or improvements are added to the exemplary embodiments described above within the technical scope of the exemplary embodiments of the present invention, and are apparent from the description of the claims.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
perform grouping on a plurality of devices for each location at which the device is positioned based on position information, which is information related to positions of the plurality of devices;
perform regrouping so that at least one device belonging to each grouped group belongs to another group; and
create a schedule of changing software used in the device for each regrouped group,
wherein the processor is configured to use state information which is information related to use states of the plurality of devices to perform the regrouping,
wherein the processor is configured to use frequencies of use of the devices as the state information to collect a device having a higher frequency of use into at least one group,
wherein the processor is configured to perform the regrouping on devices other than the device having the higher frequency of use.

2. The information processing apparatus according to claim 1,
wherein the processor is configured to create the schedule by using the state information.

3. The information processing apparatus according to claim 2,
wherein the processor is configured to use a frequency of use of the device as the state information, and create a schedule of assigning a time slot at which software is changed, in accordance with the frequency of use of the device.

4. The information processing apparatus according to claim 1,
wherein the position information is at least one of subnet information and installation place information.

5. An information processing system comprising:
a plurality of devices on which software which realizes a predetermined function operates, and
an information processing apparatus which changes the software of the plurality of devices,
the information processing apparatus including a processor configured to
perform grouping on the plurality of devices for each location at which the device is positioned based on position information, which is information related to positions of the plurality of devices;
perform regrouping so that at least one device belonging to each grouped group belongs to another group; and
create a schedule of changing the software for each regrouped group,
wherein the processor is configured to use state information which is information related to use states of the plurality of devices to perform the regrouping,
wherein the processor is configured to use frequencies of use of the devices as the state information to collect a device having a higher frequency of use into at least one group,
wherein the processor is configured to perform the regrouping on devices other than the device having the higher frequency of use.

6. A non-transitory computer readable medium storing a program causing a computer to realize:
a first distribution function of performing grouping on a plurality of devices for each location at which the device is positioned based on position information, which is information related to positions of the plurality of devices;
a second distribution function of performing regrouping so that at least one device belonging to each group grouped by the first distribution function belongs to another group; and
a creation function of creating a schedule of changing software used in the device for each group regrouped by the second distribution function,
the program further causes the computer to:
use state information which is information related to use states of the plurality of devices to perform the regrouping;
use frequencies of use of the devices as the state information to collect a device having a higher frequency of use into at least one group; and perform the regrouping on devices other than the device having the higher frequency of use.

* * * * *